Figure 1:
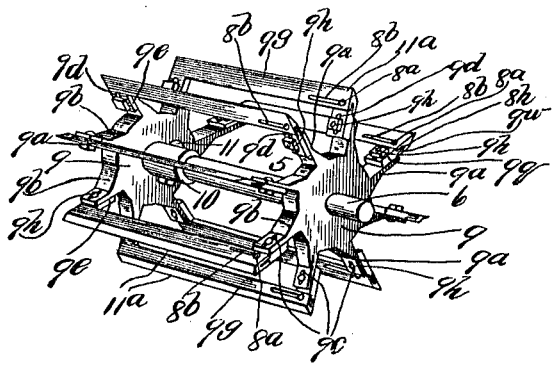

W. W. LOWE.
STALK CHOPPING ROLLER.
APPLICATION FILED FEB. 1, 1911.

992,017.

Patented May 9, 1911.

Witnesses
Francis T. Boswell.
R. Cox

Inventor
Wallace W. Lowe.
By D. Swift & Co.
Attorney

UNITED STATES PATENT OFFICE.

WALLACE W. LOWE, OF BYRON, GEORGIA.

STALK-CHOPPING ROLLER.

992,017.  Specification of Letters Patent.  Patented May 9, 1911.

Original application filed November 12, 1910, Serial No. 592,129. Divided and this application filed February 1, 1911. Serial No. 605,980.

*To all whom it may concern:*

Be it known that I, WALLACE W. LOWE, a citizen of the United States, residing at Byron, in the county of Houston and State of Georgia, have invented a new and useful Stalk-Chopping Roller; and I do hereby declare the following to be a full, clear, and exact description of the invention, such as will enable others skilled in the art to which it appertains to make and use the same.

This invention relates to the art of farming implements, such as stalk cutters, and it more especially pertains to a new and useful cutting wheel or cylinder.

The object of the invention is to provide a novel form of revolving cutter, in which the cutting knives or members are radially adjustable.

A further object of the invention is to construct the cutting cylinder in such wise, as to permit the cutting knives or members to be adjusted parallel with the axis of the cylinder. The adjustment of the cutting knives parallel with the axis of the cylinder is accomplished by mounting one of the head members of the cylinder so as to slide upon the shaft thereof, and providing slot and pin connections between the cutting knives and the radially adjustable members of the opposite head member. This cutting cylinder may be applied to any form of stalk cutter frame, but it is clearly manifest that it is especially adapted for use in connection with the stalk cutter frame shown, described, and claimed in the pending application filed Nov. 12, 1910, Serial No. 592,129, from which application the present form of cutting cylinder is divided.

In the drawings, there is only disclosed one form of the invention, but in practical fields this form may require alterations, to which the applicant is entitled, provided the alterations are comprehended by the appended claims.

The invention comprises further features and combination of parts which will be hereinafter more fully set forth, shown in the drawings and claimed.

Figure 2:
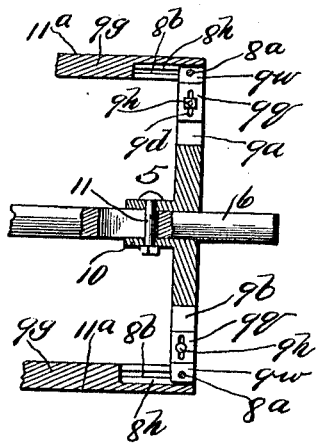

In the drawings:—Figure 1 is a view in perspective of the skeleton cutting roller or cylinder constructed in accordance with the invention. Fig. 2 is a sectional view through the cutting roller or cylinder.

Referring to the drawings, 5 designates the cutting roller or cylinder as a whole, and comprising the end plates 9, which are arranged on the shaft 6. These plates 9 are provided with sleeves 10, through which and the shaft 6 bolts 11 penetrate, in order to hold the plates and sleeves adjustably and securely to the shaft. The plates are provided with radially extending projections $9^a$, which are suitably braced with regard to the plates, as shown at $9^b$, so as to afford rigidity for the projections, as the roller travels over soil. The projections are formed with slight slots $9^c$, through which and the openings $9^d$ of the projections $9^e$ of the knives $9^g$, bolts $9^h$ extend, there being suitable nuts threaded to the bolts for securing the knives in position. It will be observed that by the provision of the bolts and the openings of the projections, the knives may be adjusted radially with regard to the roller. The knives are angular in contour and are provided with cutting edges $11^a$, and are made of steel or any other suitable material properly tempered. The plates 9, however, are made of cast steel, in order to further insure rigidity for the roller.

The knives $9^g$ have one of their ends provided with recesses $8^h$, into which the reduced ends $9^w$ of the sections $9^q$ extend. These reduced ends are secured in place by the bolts $8^a$, which penetrate through the slots $8^b$. By this structure the end plates of the cutting roller or cylinder may be adjusted, and by the other slot and pin connections the cutting knives may be adjusted radially.

From the foregoing it will be observed that a novel form of cutting roller or cylinder having cutting knives, which may be adjusted radially of the shaft and in parallel with the axis of the roller is provided, and one which has been found to be simple in construction and practicable in operation.

The invention having been set forth, what is claimed as new and useful is:—

In a cutting roller or cylinder, a shaft, a skeleton frame thereon comprising solid end plates, said end plates being adjustable longitudinally of the shaft and provided with radially extending projections, slotted members adjustably secured to the projections of one plate and provided with restricted outer ends, angular cutting knives having their angled ends adjustably secured to the projections of one of the plates, while their other ends are slotted and provided with adjoining recesses to receive the restricted outer ends of the members, and means penetrating the slots and the restricted ends for holding the parts together, thus constituting means for adjusting the knives parallel with the axis of the shaft.

In testimony whereof I have signed my name to this specification in the presence of two subscribing witnesses.

WALLACE W. LOWE.

Witnesses:
J. R. MATHEWS,
BURNEY SMISSON.

Copies of this patent may be obtained for five cents each, by addressing the "Commissioner of Patents, Washington, D. C."